March 1, 1932. H. W. WEBB 1,847,455
REELING MECHANISM
Filed June 28, 1928 3 Sheets-Sheet 2
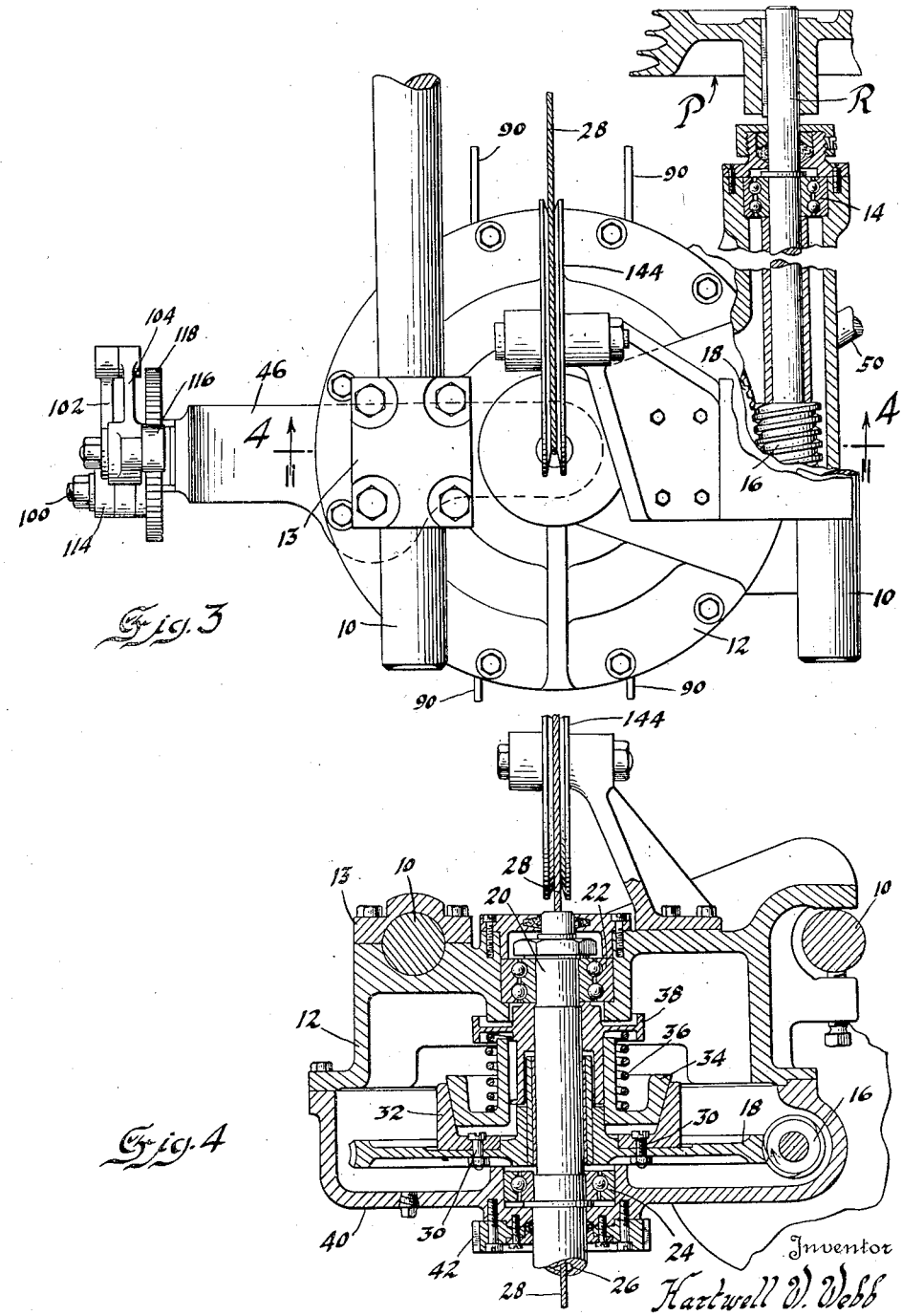

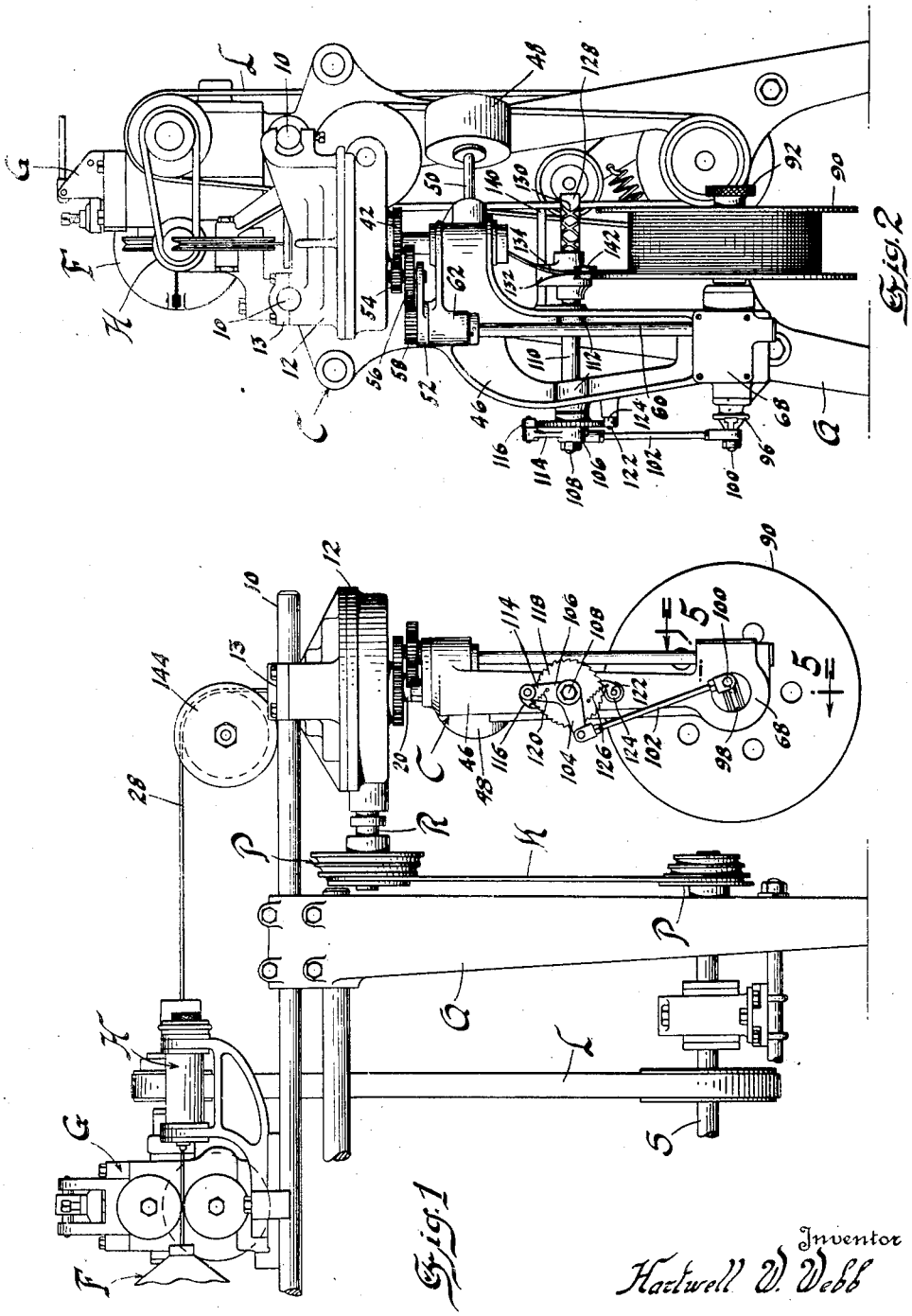

March 1, 1932. H. W. WEBB 1,847,455
REELING MECHANISM
Filed June 28, 1928  3 Sheets-Sheet 3

Inventor
Hartwell W. Webb
By Blackmore, Spencer & Hink
Attorney

Patented Mar. 1, 1932

1,847,455

UNITED STATES PATENT OFFICE

HARTWELL W. WEBB, OF FLINT, MICHIGAN, ASSIGNOR TO A C SPARK PLUG COMPANY, OF FLINT, MICHIGAN, A COMPANY OF MICHIGAN

REELING MECHANISM

Application filed June 28, 1928. Serial No. 288,992.

This invention relates to a reeling mechanism and has particular reference to a reeling mechanism for winding up the flexible cable from a flexible cable winding machine as shown in copending application Serial Number 288,990, filed June 28, 1928.

The reeling mechanism is shown as applied to the end of the cable winding machine disclosed in the copending application and is attached to the extended ends of a pair of rods which serve as a supporting means for the various parts of the cable winding machine. The mechanism is driven from the machine by means of suitable pulleys and shafting.

The reeling mechanism is suspended from the rods by means of a stationary housing inclosing gearing to which there is rigidly attached a shaft extending without the housing. The shaft extends through a stationary gear rigid with the housing and has rigidly attached to its free end a bracket adapted to rotate with the shaft.

Mounted on the bracket is a suitable gearing which drives a second shaft mounted in bearings in the bracket. The lower end of the second shaft operates a third shaft on the free end of which there is rigidly secured a reel adapted to receive the flexible cable from the machine.

The shaft which mounts the reel has secured to its end a wheel or disc having a groove adapted to adjustably receive a pin. Pivoted to the pin is a link which operates a ratchet mechanism which rotates a grooved shaft and causes a fork to move back and forth over the reel to cause the cable to be evenly wound on the spool. The purpose of adjustable connection is to adjust the ratchet mechanism in accordance with the diameter of the wound cable.

In the mechanism for driving the reel shaft as well as at the gearing in the stationary housing, over-running or friction clutches are provided which will slip either when the reel is driven faster than the material supplied thereto or when the bracket is caught and held from rotation for some reason or other.

On the drawings:

Figure 1 shows a side view of an end of a cable winding machine with the mechanism of the invention applied thereto.

Figure 2 is an end view of the structure shown in Figure 1.

Figure 3 is a plan view of the invention shown in Figure 1.

Figure 4 is a sectional view on the line 4—4 of Figure 3.

Figure 5:
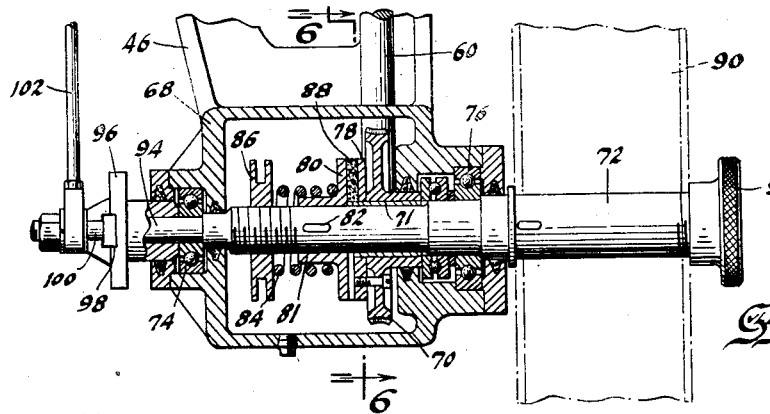
Figure 5 is a sectional view on the line 5—5 of Figure 1.
Figures 6, 7:
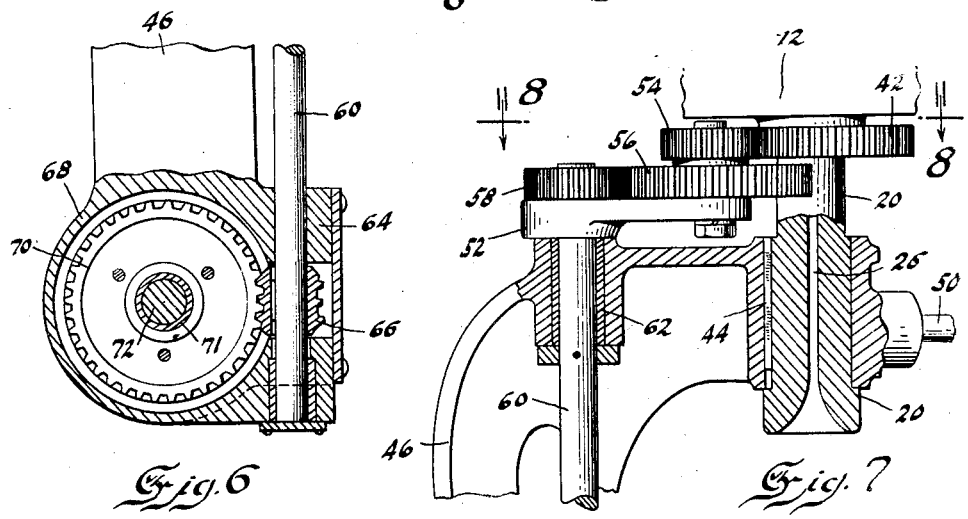
Figure 6 is a sectional view on the line 6—6 of Figure 5.
Figure 7 is an enlarged detailed view of the gearing between the housing and the bracket.
Figure 8:
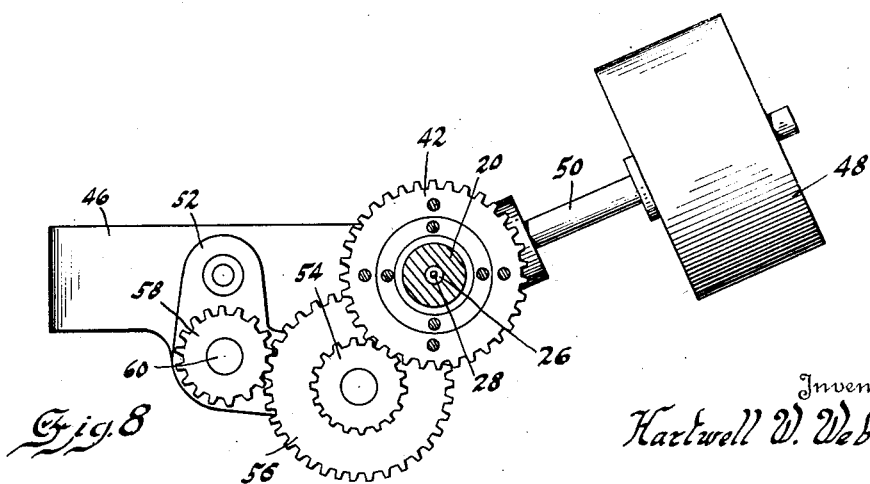
Figure 8 is a plan view on the line 8—8 of the structure shown in Figure 7.

Referring to the drawings:

A designates the cable winding machine of the copending application, while C indicates as a whole the reeling mechanism of the present invention. In the cable winding machine there is shown a portion of the flyer F, the unwinding mechanism G, and the wire straightener H. The various parts are driven by a motor (not shown) which drives the shaft S, from which suitable belting L drives the various mechanisms of the cable winding machine.

The end of the shaft S has secured thereto a pulley P having a plurality of diameters over which there runs a belt K and drives a second pulley P similar to the pulley P on the end of the shaft S. The second pulley P drives a shaft R and from this shaft the unreeling mechanism is driven.

The unreeling mechanism is supported from the rods 10 which project beyond the end support of the cable winding machine. A housing 12 is rigidly attached to the rods 10 by means of a clamping plate 13. The housing 12 has the bearings 14 for the shaft R, and on the shaft R there is secured the worm wheel 16 which meshes with the worm wheel 18 freely mounted on a shaft 20 positioned in bearings 22 and 24 at the ends of the housing 12. The shaft 20 is hollow as shown at 26 to allow for the passage of the cable 28 therethrough. Rigidly secured to the worm wheel 18 by means of the screws 30 is one-half of a cone clutch 32. Slidably secured to the shaft 20 is the second half 34 of the cone clutch pressed against the clutch half 32 by means of a spring 36 which is held between the cone 34 and a collar 38 positioned against the bearing 22. The spring 36 will constantly urge the clutch half 34 against the clutch half 32 and the interengagement of the two clutch halves will serve as a means for driving the shaft 20 from the gearing 16, 18. If for any reason the shaft 20 cannot rotate, slip is allowed between the clutch halves 32, 34.

Rigidly secured to the lower side 40 of the housing 12 is a gear 42 having a central opening to allow for the passage of the shaft 20.

Keyed to the free end of the shaft 20 as at 44 is an L-shaped bracket 46 having a weight 48 secured by means of a rod 50 to the short arm of the L to balance the structure.

Mounted on the upper portion or short arm of the bracket 46 by means of a plate 52 are three gears 54, 56, and 58 of which gear 54 meshes with the stationary gear 42. The gear 56 is secured to the same shaft as the gear 54 and meshes with and drives the gear 58, secured to a shaft 60 mounted in bearings 62 and 64 in the bracket.

The lower end of the shaft 60 has secured thereto a worm 66 which is inclosed in a housing 68 at the lower end of the lower or longer arm of the L-shaped bracket 46. The worm 66 meshes with a worm wheel 70 inclosed in the housing 68 and is secured on a bushing or collar 71 rotatably mounted on the shaft 72, which is mounted in the bearings 74 and 76 in the ends of the housing 68. The bushing 71 has rigidly secured thereto the disc 78, and facing the disc 78 is a second disc 80 keyed to the shaft 72 by means of an integral collar 81 and the key 82. The disc 80 is constantly urged toward the disc 78 by means of a spring 84 held between the disc 80 and a collar 86 screwed onto the shaft 72. The disc 80 or the disc 78 has arranged thereon a plurality of felt pads 88 to create a frictional contact between the surface of the discs 78 and 80, which serves as a means for driving the shaft 72. If for any reason the shaft 72 cannot rotate, a slip is allowed at the adjacent surfaces of the discs 78 and 80.

Secured to the free end of the shaft 72 is a reel or spool 90 in all respects similar to the reel described and claimed in copending application Serial Number 288,993, filed June 28, 1928. The spool or reel is keyed to the free end of the shaft and held thereon by means of the nut 92, and by unscrewing the nut the spool or reel 90 may be removed.

The opposite end 94 of the shaft 72 has secured thereto the wheel or disc 96 provided with a groove 98 in which there is adjustably mounted the pin 100, to which there is pivoted the link 102, pivoted at its opposite end to one arm 104 of the bell crank lever 106. The bell crank lever is pivoted at 108 to a shaft 110 mounted in bearings 112 in the long leg of the bracket 46. Pivotally secured to the second arm 114 of the bell crank lever 106 is a pawl 116 which operates on a ratchet wheel 118. A spring 120 attached to the arm 114 and the pawl 116 holds the pawl constantly in engagement with the teeth of the ratchet wheel. Pivoted to the bracket 46 as at 122 is a second pawl 124 held by means of a spring 126 against the teeth of the ratchet 118. The pawls 116 and 124 permit the rotation of the ratchet wheel 118 in but one direction.

The opposite end 128 of the shaft 110 is grooved as shown at 130 and has mounted thereon the carriage 132, having a fork 134, between the tines of which there is positioned the rod 140 rigidly secured to the bracket 46 and which rod prevents the carriage 132 from rotating. The carriage has suitable teeth to mesh with the grooves 130 and is also provided with tines 142 between which there is received the cable 28 from the cable winding machine.

As the mechanism operates each downstroke of the link 102 will cause the ratchet 118 to move through a definite arc which in turn will rotate the shaft 110 and cause the carriage 132 to move toward the end 128 of the shaft 110. When the end is reached the carriage will reverse and travel in one of the grooves 130 in the opposite direction. This reversal of operation will take place each time the carriage reaches either end of the groove 130. The purpose of this construction is to evenly distribute the cable 28 in spirals on the reel 90.

The purpose of the adjustable connection at 98 and 100 is to allow for a variation in the arc of movement of the ratchet 118 in accordance with the thickness of the cable 28. If a thicker cable is wound a greater movement of the ratchet 118 and accordingly a more rapid movement of the carriage 132 across and back over the reel 90 is required. By adjusting the pin 100 toward or away from the center of the slot 98 the proper degree of movement of the carriage 132 is attained.

The operation of the mechanism is as follows:

The shaft R will be driven by means of pulleys P and belt K. By means of the worm 16 and the worm wheel 18 the shaft 20 is driven through the intermediary of the slipping clutch 32, 34. The rotation of the shaft 20 will revolve the bracket 46 rigid therewith and due to the rotation of the bracket 46 the gear 54, which revolves about the gear 42, will drive its shaft and thereby rotate the gear 56 which in turn will transmit its motion to the gear 58 to drive the shaft 60. The shaft 60 will rotate the worm 66 rigid therewith which in turn drives the worm wheel 70 rigid with the bushing or collar 71. The collar 71 drives the disc 78 rigid therewith, and through the intermediary of the felt pads 88 the disc 80, which is the second half of the slipping clutch, is driven. Disc 80 is keyed to the shaft 72 and will accordingly drive the shaft which will rotate the reel 90 secured to one shaft end and also rotate the wheel or disc 96 secured to the opposite end. The rotation of the disc 96 will give an up and down motion to the link 102 which, through the intermediary of the bell crank lever 106, will operate the pawl 116 to and fro to rotate ratchet wheel which is rigid with the shaft 110. The rotation of the shaft 110 will cause the carriage 132 to move back and forward over the grooved end 128 of the shaft 110 and equally distribute the cable 28 over the spool 90.

The cable 28 as it comes from the cable winding machine A passes over a grooved pulley 144 through the bore 26 of the shaft 20 and between the tines 142 of the carriage 132 to be distributed over the reel 90.

For a disclosure of the parts of the cable winding machine not described attention is directed to copending application, Serial Number 288,990, filed June 28, 1928.

I claim:

1. In a device of the class described, a reeling mechanism adapted to be attached to and power driven from a machine, a stationary housing forming a mount for the mechanism, gearing in said housing driven from the machine, a shaft driven from said gearing, a bracket rigidly attached to said shaft, driving mechanism mounted on said bracket, and a reel mounted on and driven from said driving mechanism.

2. In a device of the class described, a power driven reeling mechanism, a stationary housing serving as a mount for the mechanism, a gear rigid with said housing, gearing in said housing, a shaft driven from said gearing and extending through said rigid gear, a bracket rigid with said shaft and rotated therewith, a shaft on said bracket driven from said rigid gear due to the rotation of the bracket, a reel mounted on said bracket and having operative connection with said last named shaft to cause rotation of the reel.

3. In a device of the class described, a power driven reeling mechanism, a housing serving as a mount for the mechanism, driven gearing in said housing, a gear rigid with said housing, a shaft driven from said gearing and passing through said gear, a bracket rigidly mounted on said shaft to rotate therewith, a shaft mounted in the free end of said bracket, a reel mounted on said last named shaft, and means to drive said last named shaft from said first named shaft.

4. In a device of the class described, a power driven reeling mechanism, a housing serving as a mount for the mechanism, driven gearing in said housing, a gear integral with said housing, a shaft driven from said gearing and extending through said gear, a bracket rigidly secured to said shaft, gearing mounted on said bracket to rotate about and be driven from said gear, a shaft mounted in said bracket and driven from said second named gearing, a third shaft mounted in said bracket and driven from said second shaft, and a reel rigidly mounted on said third shaft and rotated thereby.

5. In a device of the class described, a reeling mechanism adapted to be attached to and power driven from a machine, a stationary housing forming a mount for the mechanism, gearing in said housing driven from the machine, a shaft driven from said gearing, a bracket rigidly attached to said shaft, a driving mechanism mounted on said bracket, and a reel mounted on and driven from said driving mechanism, said driving mechanism driven by the rotation of said bracket.

6. In a device of the class described, a power driven reeling mechanism, a stationary housing serving as a mount for the mechanism, a gear rigid with said housing, gearing in said housing, a shaft driven from said gearing and extending through said rigid gear, a bracket rigid with said shaft and rotated therewith, a shaft on said bracket driven from said rigid gear due to the rotation of the bracket, a reel mounted on a shaft mounted in said bracket, said last-named shaft having a geared connection with said second named shaft to cause rotation of the reel.

7. In a device of the class described, a power driven reeling mechanism, a stationary housing serving as a mount for the mechanism, a gear rigid with said housing, gearing in said housing, a shaft driven from said gearing and extending through said rigid gear, a bracket rigid with said shaft and rotated therewith, a shaft on said bracket driven from said rigid gear due to the rotation of the bracket, and a reel mounted on said bracket and having operative connection with said last-named shaft to cause rotation of the reel, said operative connection including a slipping clutch to allow the drive to slip when it runs ahead of the material delivered to the reel.

8. In a device of the class described, a power driven reeling mechanism, a stationary housing serving as a mount for the mechanism, a gear rigid with said housing, gearing in said housing, a shaft driven from said gearing and extending through said rigid gear, a bracket rigid with said shaft and rotated therewith, a shaft on said bracket driven from said rigid gear due to the rotation of the bracket, a reel mounted on said bracket and having operative connection with said last-named shaft to cause rotation of the reel, and means mounted on said bracket and driven from said bracket shaft for causing the reeled material to be equally distributed on the reel.

9. In a device of the class described, a power driven reeling mechanism, a stationary housing serving as a mount for the mechanism, a gear rigid with said housing, gearing in said housing, a shaft driven from said gearing and extending through said rigid gear, a bracket rigid with said shaft and rotated therewith, a shaft on said bracket driven from said rigid gear due to the rotation of the bracket, a reel mounted on said bracket and having operative connection with said last-named shaft to cause rotation of the reel, means mounted on said bracket and driven from said bracket shaft for causing the reeled material to be equally and uniformly wound on the reel, and means for adjusting the travel of said means according to the thickness of the reeled material.

10. In a device of the class described, a power driven reeling mechanism, a housing serving as a mount for the mechanism, driven gearing in said housing, a gear integral with said housing, a shaft driven from said gearing and extending through said gear, a bracket rigidly secured to said shaft, gearing mounted on said bracket to rotate about and be driven from said gear, a shaft mounted in said bracket and driven from said second named gearing, a third shaft mounted in said bracket and driven from said second shaft, and a reel rigidly mounted on said third shaft and rotated thereby, said first named gearing and said first named shaft having central openings or bores to allow a cable to pass therethrough to be wound on the reel.

11. In a device of the class described, a power driven reeling mechanism, a housing serving as a mount for the mechanism, driven gearing in said housing, a gear integral with said housing, a shaft driven from said gearing and extending through said gear, a bracket rigidly secured to said shaft, gearing mounted on said bracket to rotate about and be driven from said gear, a shaft mounted in said bracket and driven from said second named gearing, a third shaft mounted in said bracket and driven from said second shaft, a reel rigidly mounted on said third shaft and rotated thereby, and means mounted on said bracket and driven from said last-named shaft for equally distributing the material to be reeled on the reel.

12. In combination with a cable winding machine having a plurality of supporting rods, a reeling mechanism suspended from said rods in a vertical position at one end of said machine, the lower end of said mechanism being free and above the ground.

13. In combination with a cable winding machine having a plurality of supporting rods, a housing secured to said rods, gearing mounted in said housing, a reeling mechanism suspended from said housing, and means to operate said reeling mechanism through said gearing.

14. In a strand reeling mechanism, means for suspending said mechanism, said mechanism including an L-shaped bracket suspended at one extremity of one of its legs, a reel mounted at the other leg, and means for driving said mechanism to wind said strand on said reel.

15. In a strand reeling mechanism, a support for mounting a spool, means to rotate the spool to wind up the strand, and intermittently operated means for equally distributing said strand on said spool, said intermittently operated means including a member eccentrically and adjustable attached to said rotating means, a link attached to said eccentric at one end and operating a ratchet at its other end.

16. In a device of the class described, a reeling mechanism adapted to be attached to and power driven from a machine, a stationary housing forming a mount for the mechanism, gearing in said housing driven from the machine, a shaft driven from said gearing, a slipping clutch in the drive connection between said shaft and gearing, a bracket rigidly attached to said shaft, a driving mechanism mounted on said bracket, and a reel mounted on and driven from said driving mechanism, said driving mechanism being driven by the rotation of said bracket.

In testimony whereof I affix my signature.

HARTWELL W. WEBB.